US008359320B2

(12) United States Patent
Howcroft et al.

(10) Patent No.: US 8,359,320 B2
(45) Date of Patent: Jan. 22, 2013

(54) METADATA REPOSITORY AND METHODS THEREOF

(75) Inventors: Jerald R. Howcroft, Beverly Hills, MI (US); David C. Gibbons, Lincroft, NJ (US); Vishwa M. Prasad, Malawan, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 833 days.

(21) Appl. No.: 11/932,061

(22) Filed: Oct. 31, 2007

(65) Prior Publication Data

US 2009/0112808 A1    Apr. 30, 2009

(51) Int. Cl.
*G06F 3/00* (2006.01)
*G06F 17/30* (2006.01)

(52) U.S. Cl. .......................................... 707/756; 725/54
(58) Field of Classification Search .................. 707/1, 3, 707/100, 101, 756, 809; 725/54
See application file for complete search history.

(56) References Cited

U.S. PATENT DOCUMENTS

| 7,181,444 | B2 | 2/2007 | Porter et al. | |
| 2002/0161775 | A1* | 10/2002 | Lasensky et al. | 707/100 |
| 2002/0194334 | A1* | 12/2002 | Focant et al. | 709/225 |
| 2005/0015713 | A1* | 1/2005 | Plastina et al. | 715/500.1 |
| 2005/0203931 | A1* | 9/2005 | Pingree et al. | 707/100 |
| 2006/0136502 | A1 | 6/2006 | Williams et al. | |
| 2006/0253495 | A1 | 11/2006 | Png | |
| 2006/0265385 | A1* | 11/2006 | Agrawal et al. | 707/10 |
| 2008/0065699 | A1* | 3/2008 | Bloebaum et al. | 707/200 |

OTHER PUBLICATIONS

Wikipedia.org, "MPEG-7" Oct. 23, 2007, Wikipedia.org <http://en.wikipedia.org/w/index.php?title=MPEG-7&oldid=166465395>, p. 1-4.*
Yi, et al., "Automatic Generation of MPEG-7 Compliant XML Document for Motion Trajectory Descriptor in Sports Video" Apr. 13, 2004, Kluwer Academic Publishers <http://web.engr.oregonstate.edu/~millspch/papers/mtap04_4.pdf>, p. 1-18.*
Fitzgerald, John, "Tamino Technical Overview" Apr. 20, 2006, www.xml.gov <http://xml.gov/presentations/softwareag3/tamino.ppt>, p. 1-21.*
Aiken, Peter, et al., "Microsoft Computing Dictionary" 2002, Microsoft Press, 5th Edition, p. 561.*

* cited by examiner

*Primary Examiner* — Jorge A Casanova
(74) *Attorney, Agent, or Firm* — Guntin & Gust, PLC; Ed Guntin

(57) ABSTRACT

A repository receives metadata from databases associated with different service providers. The repository converts the received metadata to a common format, such as MPEG7, and stores the converted metadata in a central database. The repository can also receive a query from a client device. The repository retrieves metadata associated with the query from the central database and provides it to the requesting client device. The repository can also convert the provided metadata to an appropriate format for the requesting device. Because the metadata is stored at a common location in a common format, content from different providers can be efficiently identified.

23 Claims, 2 Drawing Sheets

METADATA REPOSITORY AND METHODS THEREOF

FIELD OF THE DISCLOSURE

The present disclosure generally relates to data management, and more particularly relates to management of metadata.

BACKGROUND

A multimedia service provider makes available multimedia content from different content providers to a user via a data network. It is typically useful for the service provider to also provide metadata for the provided content. The service provider uses the metadata to develop content guides that identify the content that is available to the user. For example, metadata obtained from a video content provider can be used to develop an electronic program guide (EPG). However, different content providers can employ different metadata formats. This can make it difficult for the multimedia provider to efficiently develop the program content guides.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

A method and system for managing metadata is disclosed. A repository receives metadata from databases associated with different service providers. The repository converts the received metadata to a common format, such as MPEG7, and stores the converted metadata in a central database. The repository can also receive a query from a client device. The repository retrieves metadata associated with the query from the central database and provides it to the requesting client device. The repository can also convert the provided metadata to an appropriate format for the requesting device. Because the metadata is stored at a common location in a common format, content from different providers can be efficiently identified.

Figure 1:
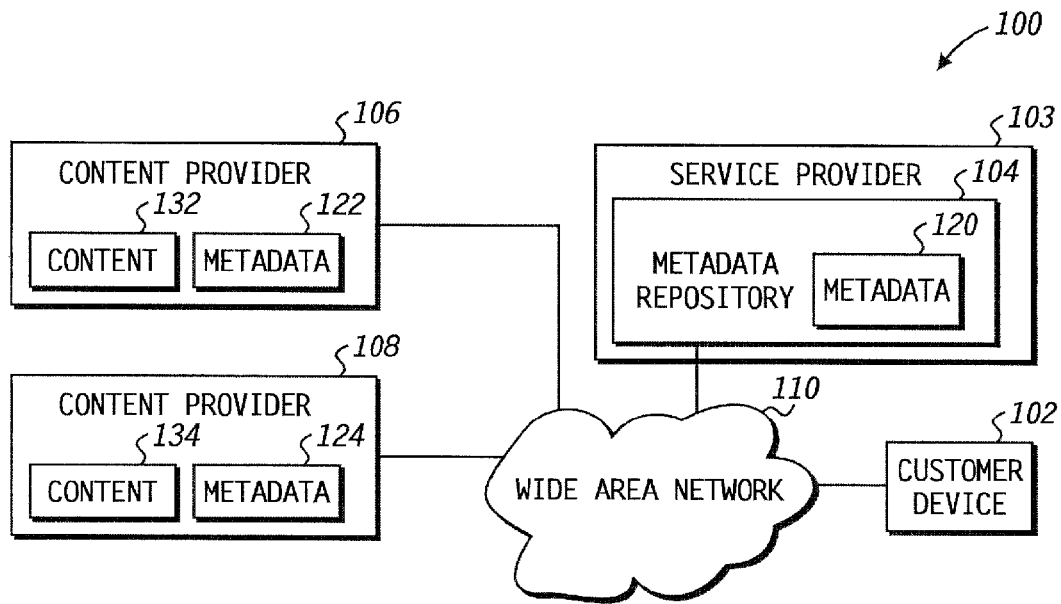
FIG. 1 is a block diagram illustrating an embodiment of a particular embodiment of a data network.

FIG. 1 shows a block diagram of a particular embodiment of a data network 100 is illustrated. The data network 100 includes a customer device 102, a service provider including metadata repository 104, and content providers 106 and 108, each connected to a wide area network 110. The wide area network 110 can be, for example, a packet switched interconnection of a plurality of networks, such as the Internet. Accordingly, the wide area network 110 provides a communication medium for devices connected to the network.

The service provider 103 provides access to multimedia content available via the wide area network 110 to customers. Accordingly, the service provider 103 implements services to enhance a customer's ability to retrieve multimedia content from multiple content providers. Such services can include providing a customer device with an entry point to the wide area network 110, providing a security and authentication layer for content providers, providing billing and accounting services for purchased content, or the like. The service provider 103 can also process retrieved content to enhance its presentation to a customer. For example, the service provider 103 can place retrieved video content on a tunable television channel for presentation to a customer. Further, the service provider 103 can provide content location services, such as searching tools, web portals, or the like.

The customer device 102 is a device configured to interface with the service provider 103 to present multimedia content. Accordingly, the customer device 102 can be a personal computer, set-top box (STB), television, audio system, or the like. The customer device 102 can also be a portable device, such as a personal data assistant (PDA), a mobile phone, personal audio device, or other portable device configured to present multimedia to a user. To obtain multimedia content for presentation, the customer device 102 accesses the wide area network 110 via a wired or wireless network connection.

The content providers 106 and 108 store and provide multimedia content 132 and 134, respectively via the wide area network 110. Such multimedia content can include, for example, video content, such as movies, television programs, or the like; audio content, such as music, sound clips, or the like; or game content, such as online games, downloadable games, or the like. The content providers 106 and 108 can each be any source that can provide multimedia content via the wide area network 110, including a television broadcaster, movie-on-demand provider, game server, online music repository, or the like.

The content providers 106 and 108 maintain metadata 122 and 124 respectively. The metadata includes data identifying characteristics of content items. Accordingly, in the example of FIG. 1 the metadata 122 includes data identifying characteristics of individual content items included in the content 132. The characteristics identified by the metadata 122 and 124 depend on the type of associated content. For example, if the content 106 includes video content items, such as on-demand movies or television channels, the associated metadata 122 will include data associated with the video content, such as program titles, cast, crew, ratings, length, channel number, or the like. If the content 134 includes audio content, such as a set of digital music files, the associated metadata 124 will include data associated with the audio content, such as song titles, artists, album titles, fidelity information, or the like. Accordingly, the individual formats of the metadata 122 and 124, including the type and order of information included in the metadata depends on the type of media content associated with the particular metadata. The format of the metadata also depends on the content provider that develops the metadata. Thus, the format of the metadata 122 can differ from the format of the metadata 124 even if both are associated with similar types of content.

The metadata 122 and metadata 124 can be maintained in individual databases. These databases can be searchable, providing an efficient way to identify content items included in the content 132 and 134. In addition, as content items are added to and removed from the content 132 and 134, the databases can be updated so that the metadata 122 and 124 maintain an up-to-date profile of content items included in the content 132 and 134, respectively.

The service provider 103 maintains metadata 120 based on the metadata 122 and 124. To develop and maintain the metadata 120, the service provider 103 utilizes the metadata repository 104, which retrieves metadata from the databases including the metadata 122 and 124. The media repository 104 converts the retrieved metadata to a common format, such as Motion Picture Experts Group-7 (MPEG-7), and updates the metadata 120 based on the converted metadata.

The metadata repository 120 accordingly represents the metadata 122 and 124 stored in a central location and in a common format for different content providers. This can enhance the ability of the service provider 103 to provide services for customers. For example, the metadata 120 provides a basis for the service provider 103 to quickly and efficiently identify content available at disparate content providers without having to search an individual metadata database at each provider. Moreover, by converting disparate metadata to a common format, the metadata repository 104 can provide information about available content to the customer device 102 in an efficient manner.

To illustrate, the service provider 103 can provide a query interface to the customer device 102 to provide a way for a customer to locate available content. The query interface can be presented in a variety of ways, such as via a web page, through an electronic programming guide at a television display, a voice-activated search system, or the like. A customer at the customer device 102 can enter search terms and search parameters via the query interface. The search parameters indicate restrictions associated with the search. For example, the search parameters can allow the search to be restricted to particular media types, media formats, or the like. The search parameters can also restrict the search to a particular type of information, such as a title, artist, or the like.

The search terms and search parameters are communicated to the service provider 103 as a query. The metadata repository 104 uses the query to search one or more databases that store the metadata 120 and identify content items at content providers connected to the wide area network 110, such as the content providers 106 and 108. A list of the identified content items is provided by the service provider 103 to the customer device 102 as a query result. As part of the query result, the service provider 103 can also provide additional information from the metadata 120 for each listed content item. Further, the service provider can provide an option to the customer device 102 to access one or more of the listed content items. If a user at the customer device 102 selects the option, the service provider 103 retrieves the requested content from the appropriate content provider and communicates the content to the customer device 102 for presentation. Accordingly, the metadata repository 104 provides centralized storage for metadata associated with disparate content providers. This allows searches of the metadata to be performed, and search results presented more efficiently, than separate searches of metadata databases for each content provider. Moreover, because the metadata 120 stores information associated with different content providers in a common format, search results can be provided to customers in a coherent and unified fashion, even for different content providers.

Figure 2:
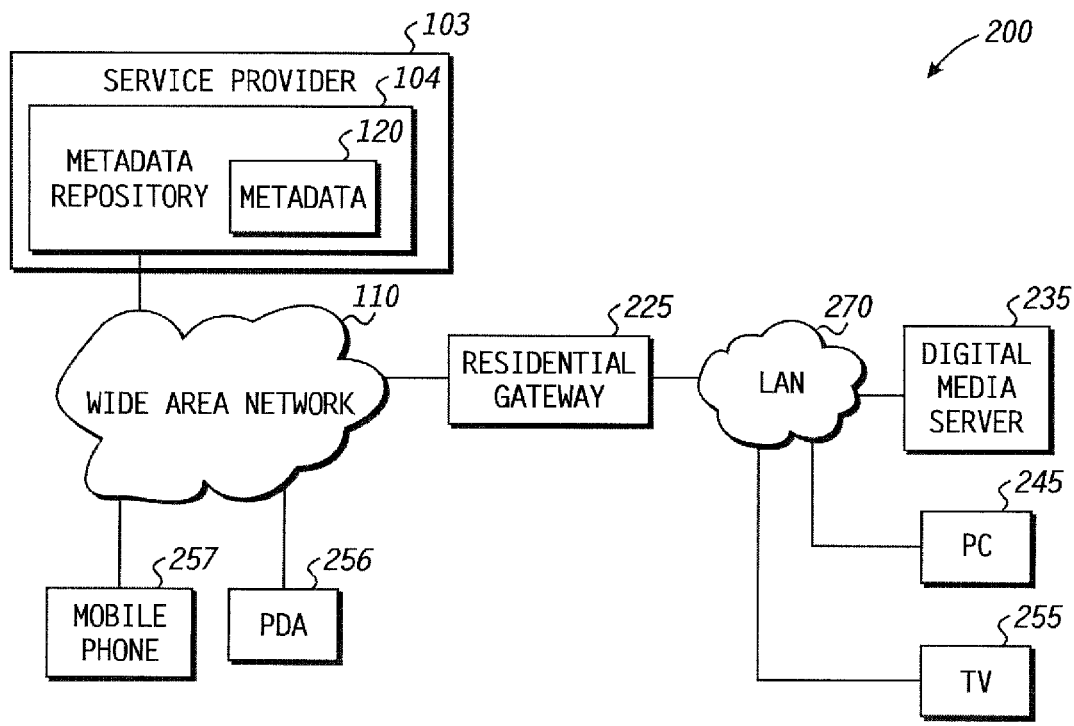
FIG. 2 is a block diagram of an alternative particular embodiment of a data network.

FIG. 2 shows a block diagram of a particular embodiment of a data network 200 including the wide area network 110 and the service provider 103. The data network 200 also includes a residential gateway 225, a PDA 256, and a mobile phone 257, each connected to the wide area network 110. In addition, the data network 200 also includes a digital media server 235, a personal computer 245, and a television 255, connected to a local area network (LAN) 270, which is connected to the residential gateway 225.

The local area network provides a communication medium between the residential gateway 225, the digital media server 235, the personal computer 245, and the television 255. In and embodiment, the local area network is a packet-switched network, such as an Ethernet network, that routes packets between these devices based on unique addresses associated with each device.

The residential gateway 225 provides an interface between the wide area network 110 and the local area network 270. Accordingly, the residential gateway 225 affords the physical layer of connection between the networks, and can also perform data link and network layer functions to facilitate communications between the devices connected to the local area network 270 and the wide area network 110. For example, the residential gateway 225 can implement addressing functions to ensure that communications received from the wide area network 110 are routed to the appropriate destination device via the local area network 270.

The digital media server 235 is a device that stores multimedia content and provides that content to other devices in the local area network 270. The digital media server 235 can also provide additional functionality, such as a search function for locally stored media, data compression, file archiving, or the like.

In operation, a customer of the service provider 103 can use the personal computer 245, the television 255, the mobile phone 257, or the personal data assistant 256 (hereinafter collectively referred to as the "customer devices") to locate media content available via the wide area network. In particular, the service provider 103 can provide a query interface to each of the customer devices, individually tailored for each device. The customer can enter a query associated with the desired content via the query interface. The query is communicated to the service provider 103 via the wide area network 110. In response, the service provider 103 accesses the metadata repository 104 to perform a search of the metadata 120 based on the query. The results of the search can be provided to the requesting customer device as result metadata.

Each of the customer devices can have its own native metadata format for efficient presentation of such data. These formats can differ depending on the type of customer device, in order to accommodate the devices' different presentation media. For example, the native metadata format for the mobile phone 257 may includes less information than the native format associated with the personal computer 245 because of the smaller form factor and available storage space of the mobile phone 257. To accommodate these different native formats, the metadata repository 104 can translate the metadata 120 between formats. In particular, the metadata repository 104 can determine the customer device to which metadata is to be communicated, determine the native format for that device, and translate the metadata to the appropriate native format. This obviates the need to maintain different metadata databases for each of the customer devices, thereby reducing storage and overhead costs.

Figure 3:
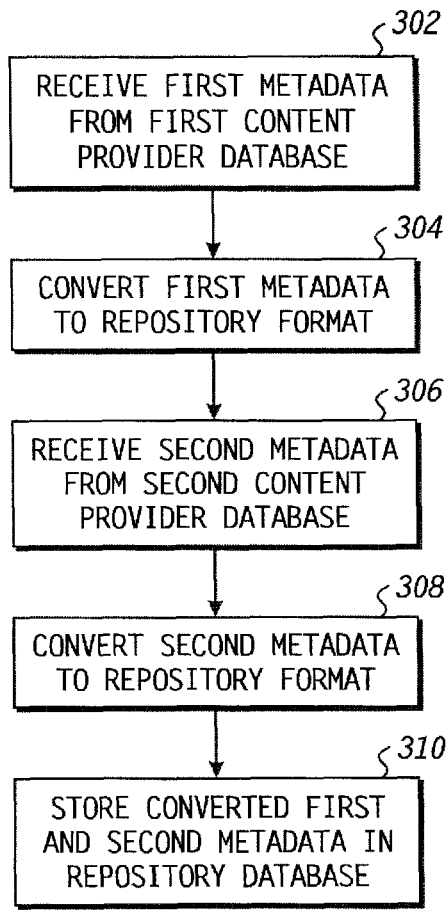
FIG. 3 is a flow diagram of a particular embodiment of a method of converting metadata at metadata repository.

FIG. 3 illustrates a flow diagram of a particular embodiment of a method of converting metadata at a metadata repository. At block 302, metadata is received from a first content provider. At block 304, the metadata is converted to a format, such as MPEG-7, that provides for a common format for all metadata at the repository. At block 306, metadata is received from a second content provider. This metadata is converted to the repository format at block 308. At block 310, the converted metadata from both content providers is stored at a repository database. Accordingly, the repository database includes metadata associated with content from different content providers.

Figure 4:
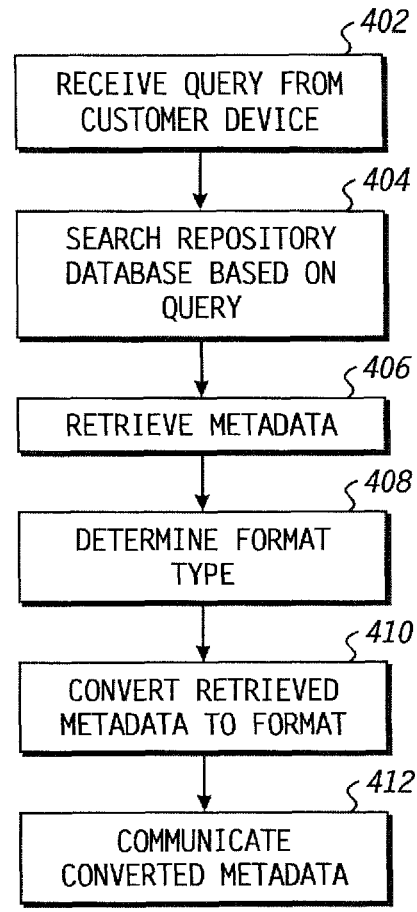
FIG. 4 is a flow diagram of a particular embodiment of a method of searching metadata at a metadata repository.

FIG. 4 illustrates a flow diagram of a particular embodiment of a method of searching a metadata database at a metadata depository. At block 402, a query is received from a customer device, such as a computer, set-top box, mobile phone, or the like. At block 404, the metadata database at the repository is searched based on the query. The metadata database includes metadata for content from different content providers.

At block 406, metadata responsive to the query is retrieved from the metadata database. At block 408, the repository determines the metadata format type associated with the customer device that communicated the query. This format type can be based on the type of customer device, based on customer preferences, or other parameters. At block 410, the repository converts the retrieved metadata to the format that has been determined. At block 412, the converted metadata is communicated to the customer device. Thus, the metadata repository can efficiently provide metadata to a variety of devices in a variety of formats using the centralized database.

Figure 5:
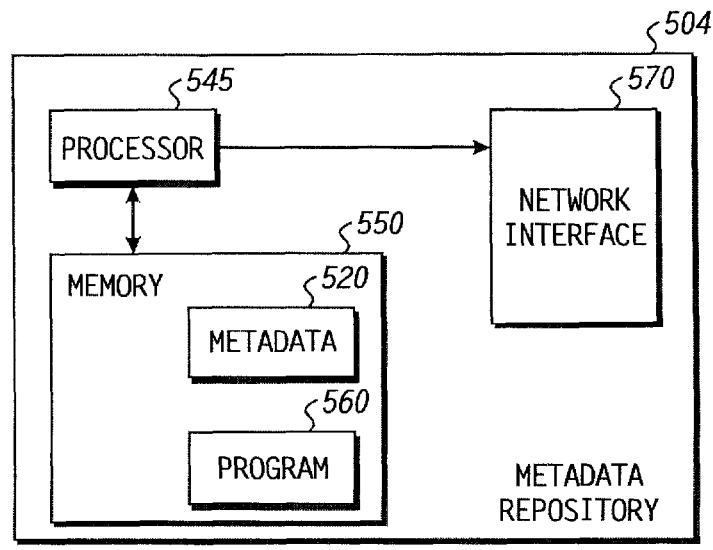
FIG. 5 is a block diagram of a particular embodiment of a metadata repository of FIG. 1.

FIG. 5 shows a block diagram of a particular embodiment of a metadata repository 504, corresponding to the traffic monitoring device 104 of FIG. 1. The metadata repository 504 includes a processor 545, a memory 550, and a network interface 570. The processor 545 is connected to the network interface 570 and the memory 550. The network interface 570 is configured to interface with the wide area network 110.

The memory 550 is a computer readable medium, and can be volatile memory, such as random access memory (RAM), or non-volatile memory, such as flash memory or a hard disk. The memory 550 stores metadata 520, corresponding to the metadata 120 of FIG. 1. The memory 550 also stores a program 560 that includes instructions to manipulate the processor 545 in order to implement one or more of the methods described herein. For example, the program 560 can include instructions to manipulate the processor 545 to convert and store metadata received via the network interface 570. Further, the program 560 can include instructions to manipulate the processor 545 to search the metadata 520 based on queries received via the network interface 570.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
   receiving, by a system comprising a processor, first metadata in a first format from a first metadata database at a first content provider associated with a wide area network, the first metadata being associated with a first content item;
   receiving, by the system, second metadata in a second format from a second metadata database at a second content provider associated with the wide area network, the second metadata being associated with a second content item;
   converting, by the system, the first metadata to third metadata in a third format;
   converting, by the system, the second metadata to fourth metadata in the third format;
   storing, by the system, the third and fourth metadata in a third metadata database;
   receiving, by the system, a first query from a customer device coupled to a residential gateway;
   searching, by the system, the third metadata database based on the first query;
   identifying, by the system, a first result in response to searching the third metadata database based on the first query, the first result comprising metadata in the third format;
   identifying, by the system, a native format used by the customer device to process metadata;
   determining, by the system, that the native format used by the customer device is incompatible with the third format; and
   providing, by the system, the customer device the first result in the native format of the customer device.

2. The method of claim 1, wherein the providing of the first result comprises:
   translating the first result to reformatted metadata in the native format; and
   providing the customer device the reformatted metadata.

3. The method of claim 2, wherein the identifying comprises determining the native format based on the first query.

4. The method of claim 3, further comprising:
receiving a second query from a second customer device coupled to the wide area network;
searching the third metadata database based on the second query;
providing a second result to the second customer device in response to searching the third metadata database based on the second query, the second result being in the third format;
determining a fifth format based on the second query;
converting the second result to sixth metadata in the fifth format in response to the second query; and
providing the sixth metadata.

5. The method of claim 2, wherein the customer device is a portable device, and wherein the native format is used by the portable device.

6. The method of claim 2, wherein the native format is associated with a video display device.

7. The method of claim 1, wherein the first metadata database is associated with media content of a first type and the second metadata database is associated with media content of a second type.

8. The method of claim 7, wherein the first type is video content and the second type is audio content.

9. The method of claim 7, wherein the first type is broadcast content and the second type is on-demand content.

10. The method of claim 1, wherein the third format is an MPEG-7 format.

11. The method of claim 1, wherein the customer device comprises a set-top box.

12. A method, comprising:
receiving, by a system comprising a processor, a first query from a first customer device connected to a residential gateway;
searching, by the system, a metadata repository based on the first query to provide a first search result, wherein the metadata repository comprises first metadata from a first metadata database at a first content provider associated with a wide area network and second metadata from a second metadata database at a second content provider associated with the wide area network, wherein the first metadata provided by the first metadata database and the second metadata provided by the second metadata database are converted by the metadata repository from dissimilar formats to a common format, and stored in the metadata repository in the common format;
identifying a native format used by the first customer device;
determining that the native format used by the first customer device is incompatible with the common format; and
communicating, by the system, the first search result to the first customer device in the native format.

13. The method of claim 12, wherein the metadata repository stores metadata in a first format and the first metadata database stores metadata in a second format that differs from the common format.

14. The method of claim 13, wherein the second metadata database stores metadata in a third format that differs from the common format.

15. The method of claim 12, wherein the first search result comprises first metadata stored in the common format, and wherein communicating the first search result comprises converting the first metadata to the native format.

16. The method of claim 15, wherein the identifying comprises identifying the native format based on a first device type of the first customer device.

17. The method of claim 16, further comprising:
receiving a second query from a second customer device;
searching the metadata repository based on the second query to provide a second search result comprising second metadata;
determining a third format based on a second device type;
converting the second metadata to the third format; and
communicating the converted second metadata.

18. A non-transitory computer readable medium configured to store a program of instructions configured to manipulate a processor, the program of instructions causing processor to perform operations comprising:
receiving first metadata in a first format from a first metadata database at a first content provider that is associated with a wide area network;
receiving second metadata in a second format from a second metadata database at a second content provider that is associated with the wide area network;
converting the first metadata to third metadata in a third format;
converting the second metadata to fourth metadata in the third format;
storing the third and fourth metadata in a third metadata database;
receiving a first query from a first customer device coupled to a residential gateway;
searching the third metadata database based on the first query;
identifying a first result in response to searching the third metadata database based on the first query, the first result comprising metadata in the third format;
identifying a native format used by the first customer device to process metadata;
determining that the native format used by the first customer device is incompatible with the third format; and
communicating the first result to the first customer device in the native format of the first customer device.

19. The computer readable medium of claim 18, wherein the wherein the communicating comprises:
converting the first result to fifth metadata in the native format; and
communicating the fifth metadata to the first customer device.

20. The computer readable medium of claim 18, wherein the native format is determined from information provided in the first query.

21. The computer readable medium of claim 18, wherein the processor further performs operations comprising:
receiving a second query from a second customer device;
searching the third metadata database based on the second query;
communicating a second result to the second customer device in response to searching the third metadata database based on the second query;
determining a fifth format based on the second query;
converting the second result to sixth metadata in the fifth format in response to the second query; and
communicating the sixth metadata to the second customer device.

22. The computer readable medium of claim 18, wherein the native format is based on a first device type.

23. The computer readable medium of claim 18, wherein the first customer device comprises a set-top box.

* * * * *